(12) United States Patent
MacLean (10) Patent No.: US 11,747,308 B2
(45) Date of Patent: Sep. 5, 2023

(54) DIRECTIONAL TANK ACCESSING SYSTEM

(71) Applicant: RJ MacLean LP, Stony Plain (CA)

(72) Inventor: Greg MacLean, Stony Plain (CA)

(73) Assignee: RJ MACLEAN LP, Stony Plain (CA)

(*) Notice: Subject to any disclaimer, the term of this patent is extended or adjusted under 35 U.S.C. 154(b) by 322 days.

(21) Appl. No.: 17/225,929

(22) Filed: Apr. 8, 2021

(65) Prior Publication Data

US 2021/0333240 A1 Oct. 28, 2021

(30) Foreign Application Priority Data

Apr. 8, 2020 (CA) ................................ CA 3077791

(51) Int. Cl.
*G01N 29/22* (2006.01)
*G01N 1/14* (2006.01)
*B08B 3/02* (2006.01)

(52) U.S. Cl.
CPC ............... *G01N 29/22* (2013.01); *G01N 1/14* (2013.01); *B08B 3/02* (2013.01)

(58) Field of Classification Search
CPC ........ G01N 29/22; G01N 29/043; G01N 1/14; G01N 2291/0258; G01N 2001/1037; G01N 2001/1418; B08B 3/02; B08B 3/024; B08B 2203/0229; B08B 9/093; B08B 9/0933
See application file for complete search history.

(56) References Cited

U.S. PATENT DOCUMENTS

| | | | |
|---|---|---|---|
| 4,269,064 A | 5/1981 | Johnson et al. | |
| 4,294,124 A | 10/1981 | Kalwaitis | |
| 4,376,392 A | 3/1983 | Beitel | |
| 4,625,570 A | 12/1986 | Witherspoon et al. | |
| 4,951,512 A | 8/1990 | Mazza et al. | |
| 5,408,890 A | 4/1995 | Klaus | |
| 5,445,038 A | 8/1995 | Hueller | |
| 5,450,763 A | 9/1995 | Masson | |
| 6,357,306 B1 | 3/2002 | Jaeger | |
| 7,481,124 B2 | 1/2009 | Schadt | |

(Continued)

FOREIGN PATENT DOCUMENTS

CN 105092282 11/2015

OTHER PUBLICATIONS

My Diesel Doctor, Algae-X TS4-SS Axi Tank Sampler 4 OZ., Product webpage from mydieseldoctor.com, at least as early as Feb. 9, 2017, 1 page.

(Continued)

*Primary Examiner* — Suman K Nath
(74) *Attorney, Agent, or Firm* — Colby Nipper PLLC (57) ABSTRACT

A system and method for accessing contents of a tank through a tank opening disposed on the tank. The system and method may obtain samples, use a sensor to analyze sludge or may clean the tank. The system has a rotatable head connected to a rigid tube having a central axis. The rotatable head is adapted to be inserted through the tank opening. The rotatable head comprises a displacer and a head opening. A flexible tube has an insertable end and an external end. The flexible tube is slideably movable within the rigid tube and has a range of motion relative to the rigid tube so that the insertable end of the flexible tube can be directed by the displacer through the head opening at an angle offset from the central axis of the rigid tube.

20 Claims, 12 Drawing Sheets

(56) References Cited

U.S. PATENT DOCUMENTS

| | | | | |
|---|---|---|---|---|
| 8,176,976 B2* | 5/2012 | Havinga | ............... | E21B 19/22 |
| | | | | 166/85.1 |
| 8,261,622 B2 | 9/2012 | Kotesky | | |
| 2002/0166392 A1 | 11/2002 | Handel | | |
| 2012/0247570 A1* | 10/2012 | Zink | ................ | B08B 9/0813 |
| | | | | 137/15.01 |
| 2015/0000760 A1* | 1/2015 | Zink | ................ | B08B 9/093 |
| | | | | 137/15.04 |

OTHER PUBLICATIONS

Gammon Tech Store, Bacon Bomb, Product webpage from gammontechstore.com, at least as early as Feb. 9, 2017, 2 pages.
Nasco Tank Sampler, at least as early as Feb. 9, 2017, 1 page.
Thomas Scientific, Wheaton PVC Coliwasa, Webpage from thomassci.com, at least as early as Feb. 9, 2017, 3 pages.

* cited by examiner

DIRECTIONAL TANK ACCESSING SYSTEM

TECHNICAL FIELD

Tank accessing. Particularly, tank sampling, sensing and cleaning.

BACKGROUND

Tank cleaning is a significant maintenance issue for tank operators. Accurate sampling is required by tank owners to determine the scope of maintenance work required, particularly as it relates to the nature and consistency of sludge deposits in storage tanks. Representative sampling in above ground storage tanks has long been a problematic process. In order to obtain samples of sludge accumulating at the bottom of tanks, a sample tool is desired. Sampling protocols are typically from the top down and involve dropping a sample-bomb or canister into the sludge. These may fail because they cannot collect heavy deposits and only work on a vertical plane from above the sludge. Some current sample tools access the tanks from the top and obtain a sludge sample by driving a tube into the sludge. However, for some tanks, top access is not a convenient mode of access, particularly for floating roof tanks. The result is a mostly liquid sample with very little representative sludge. Some tank sampling tools have no mechanism to sample from specific areas within a tank. Those tank sampling tools are restricted by their structure to only sample from certain locations within the tank. These limitations in terms of the locations from which samples can be obtained may limit the usefulness of the sampling tools.

SUMMARY

There is provided a system for accessing contents of a tank through a tank opening disposed on the tank. The system comprises a rotatable head connected to a rigid tube having a central axis. The rotatable head is adapted to be inserted through the tank opening. The rotatable head comprises a displacer and a head opening. There is a flexible tube having an insertable end and an external end. The flexible tube is slideably movable within the rigid tube and has a range of motion relative to the rigid tube so that the insertable end of the flexible tube can be directed by the displacer through the head opening at an angle offset from the central axis of the rigid tube.

In various embodiments, there may be included any one or more of the following features of the system: the displacer is a sloped surface; a drive mounted outside of the tank and connected to operatively rotate the rigid tube to change the orientation of the rotatable head; the system is used for sampling and the external end of the flexible tube is operatively connected to a vacuum source outside of the tank; a high-pressure line within the flexible tube; the high-pressure line is connected to a high-pressure source outside of the tank; the high-pressure line further comprises a spray nozzle at the insertable end of the flexible tube; a plurality of spacers fixing an axial position of the high-pressure line within the flexible tube; the high-pressure line further comprises a plurality of sections of tubing threaded together; a sensor mounted on the insertable end of the flexible tube; the sensor is a sonar head; a control system operatively connected to control the rotation of the rigid tube and the sliding movement of the flexible tube within the rigid tube; a control system operatively connected to control the drive; and the flexible tubing is made from high density polypropylene.

There is also provided a method of operating a system for accessing contents of a tank through an opening. The method comprises operating a rotatable head connected to a rigid tube having a central axis. The rotatable head is inserted through the tank opening. The rotatable head comprising a displacer and a head opening. A flexible tube having an insertable end and an external end is operated. The flexible tube is slideably movable within the rigid tube and having a range of motion relative to the rigid tube so that the insertable end of the flexible tube can be directed by the displacer through the head opening at an angle offset from the central axis of the rigid tube. The rotatable head is rotated. The insertable end of the flexible tube is extended through the head opening.

In various embodiments, there may be included any one or more of the following features of the method: obtaining a sample from inside the tank through the insertable end of the flexible tube; in which obtaining a sample from inside the tank through the insertable end of the flexible tube further comprises applying a suction force from a vacuum source at the external end of the flexible tube to obtain the sample; in which a high-pressure line is provided within the flexible tube and in which the method further comprises applying high-pressure fluids into the interior of the tank through the high-pressure line; in which the high-pressure line further comprises a spray nozzle at the insertable end of the flexible tube; in which fluid from the high-pressure line is applied to deposits within the tank prior to obtaining the sample from inside the tank through the insertable end of the flexible tank; a sensor mounted on the insertable end of the flexible tube is provided and information regarding deposits in the interior of the tank is obtained using the sensor; and in which the sensor is a sonar head.

There is also provided a method of installing a system for accessing contents of a tank through a tank opening disposed on the tank. The method comprises inserting a rotatable head connected to a rigid tube having a central axis into the tank through the tank opening. The rotatable head comprises a displacer and a head opening. A flexible tube having an insertable end and an external end is inserted through the rigid tube so that the insertable end of the flexible tube is directable by the displacer through the head opening into the interior of the tank at an angle offset from the central axis of the rigid tube.

In various embodiments, there may be included any one or more of the following features of the method: the flexible tube comprises a plurality of tubing segments the method further comprising joining the plurality of tubing segments prior to inserting the flexible tube through the rigid tube; providing a drive for operatively rotating the rigid tube to change the orientation of the rotatable head; inserting a high-pressure line inside the flexible tube prior to inserting the flexible tube through the rigid tube; in which the high-pressure line comprises a nozzle, the nozzle being placed at the insertable end of the flexible tube when the high-pressure line is inserted into the flexible tube; providing a vacuum source operatively connected to the external end of the flexible tube; and providing a high-pressure source in fluid connection with the high-pressure line.

These and other aspects of the system and method are set out in the claims.

BRIEF DESCRIPTION OF THE FIGURES

Embodiments will now be described with reference to the figures, in which like reference characters denote like elements, by way of example, and in which.

DETAILED DESCRIPTION

Figure 3:
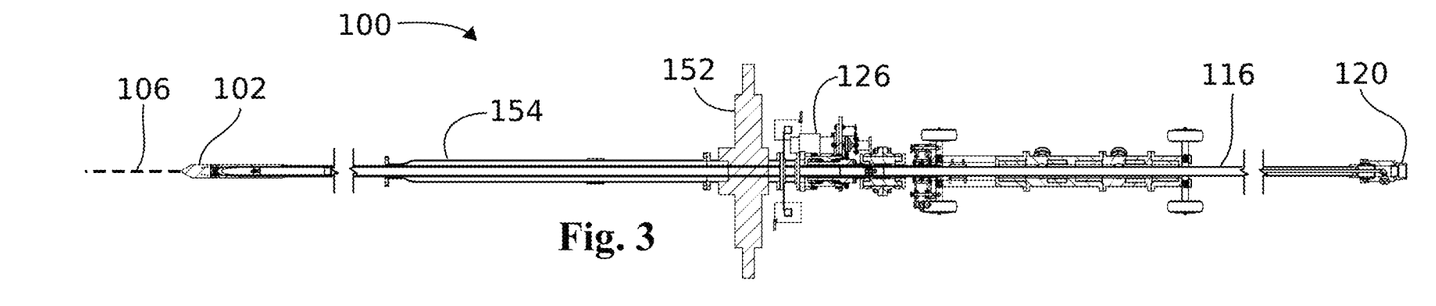
FIG. 3 is a section view of the system of FIG. 2 through the line FN-FN.
Figure 4:
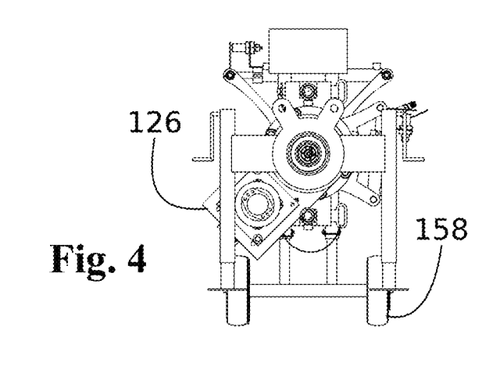
FIG. 4 is a section view of the system of FIG. 2 through the line FP-FP.
Figure 5:
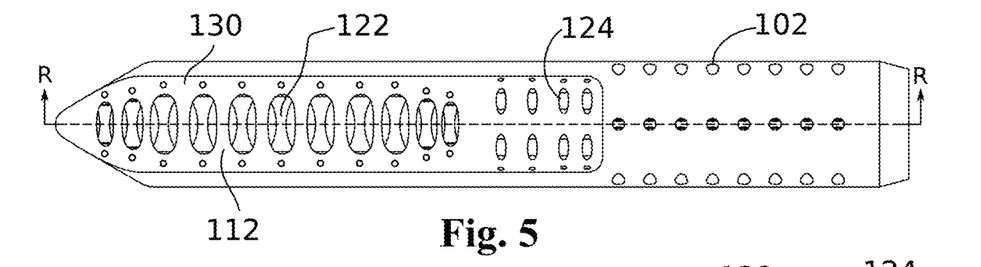
FIG. 5 is a top isometric view of a rotatable head.
Figure 6:
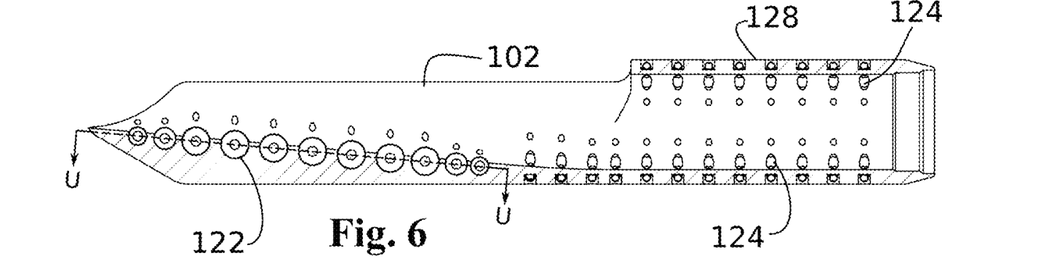
FIG. 6 is a section view of the rotatable head of FIG. 5 through the line R-R.
Figure 7:
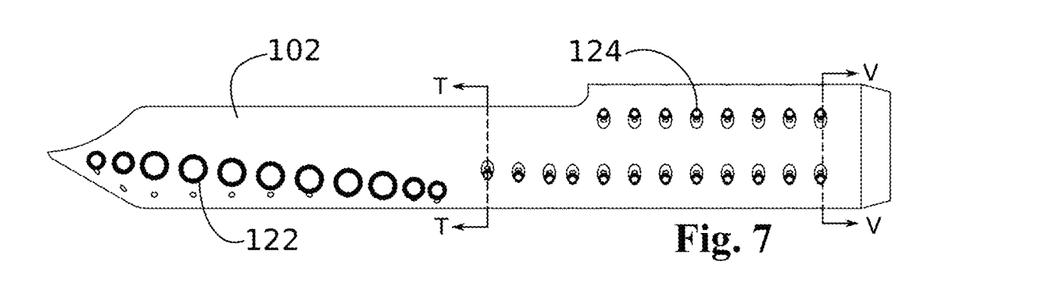
FIG. 7 is a side isometric view of the rotatable head of FIG. 5.
Figure 8:
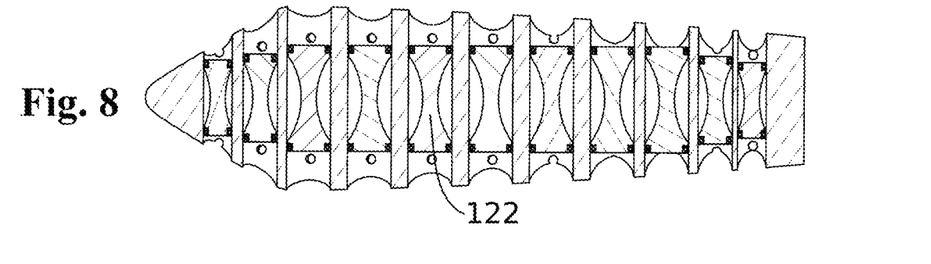
FIG. 8 is a section view of a displacer within the rotatable head through the line U-U of FIG. 6.
Figure 9:
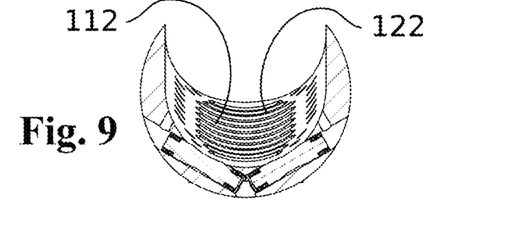
FIG. 9 is a section view of the rotatable head through the line T-T of FIG. 7.
Figure 10:
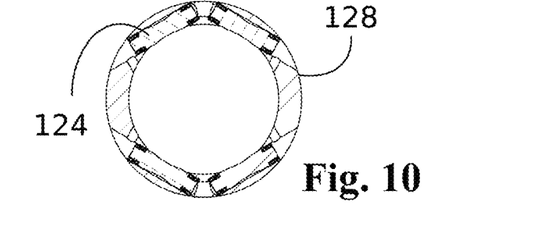
FIG. 10 is a section view of the rotatable head through the line V-V of FIG. 7.

As shown schematically in FIGS. 1-4, there is a system 100 for accessing contents of a tank 108 (FIG. 20) through a tank opening 110 (FIG. 20) disposed on the tank. A rotatable head 102 is connected to a rigid tube 104 having a central axis 106 (FIG. 3). The rotatable head 102 is adapted to be inserted through the tank opening. The rotatable head 102 includes a displacer 112 and a head opening 130. The rotatable head 102 in the embodiments in FIGS. 1-4 is a roller-head apparatus.

A flexible tube 116 having an insertable end 118 and an external end 120 is placed within the rigid tube 104. The flexible tube 116 is slideably movable within the rigid tube 104 and has a range of motion relative to the rigid tube 104 so that the insertable end 118 of the flexible tube 116 can be directed by the displacer 112 through the head opening 130 at an angle offset from the central axis of the rigid tube as shown in FIG. 3.

Figure 1:
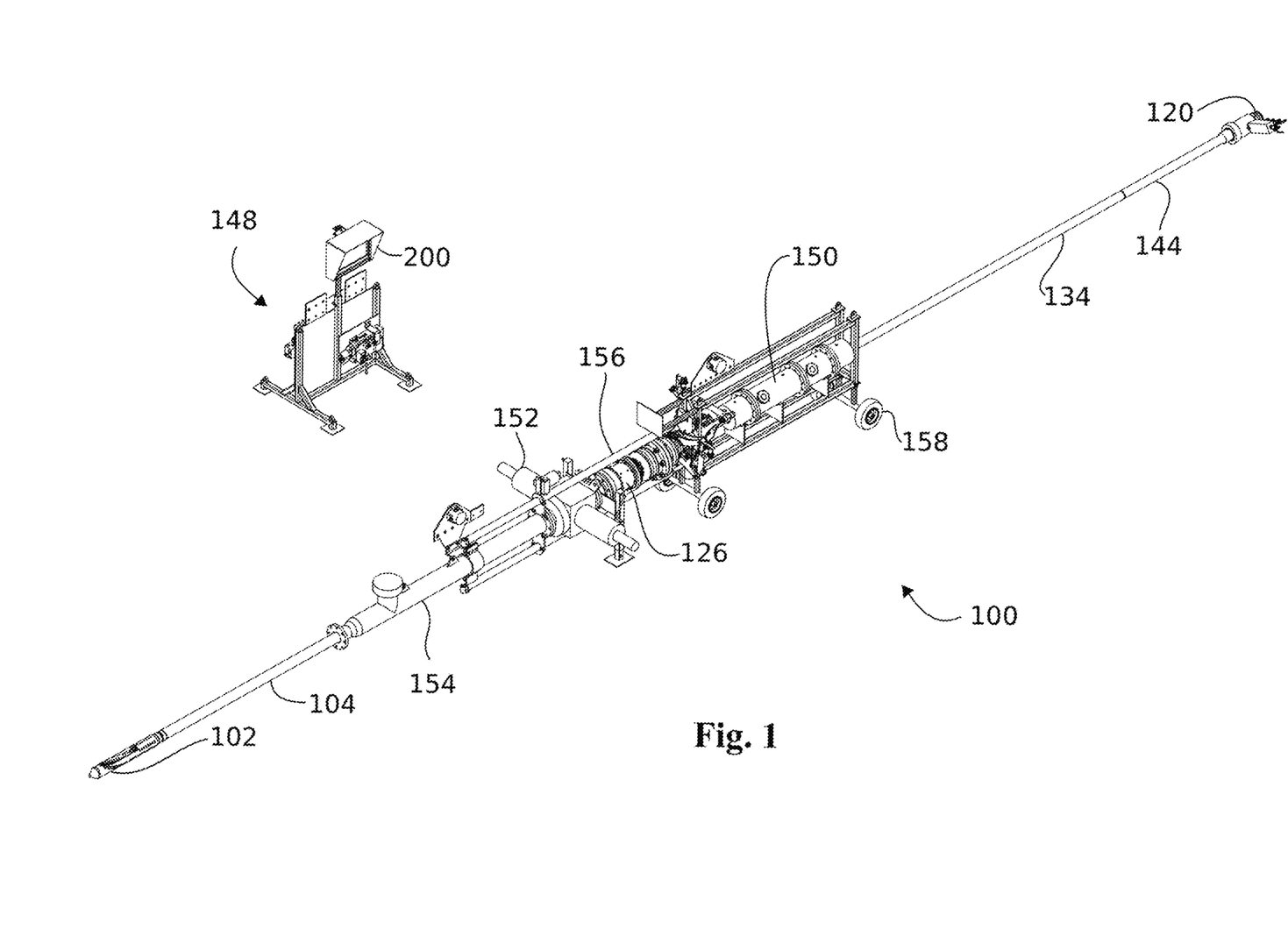
FIG. 1 is a side isometric view of a system for accessing contents of a tank.
Figure 2:
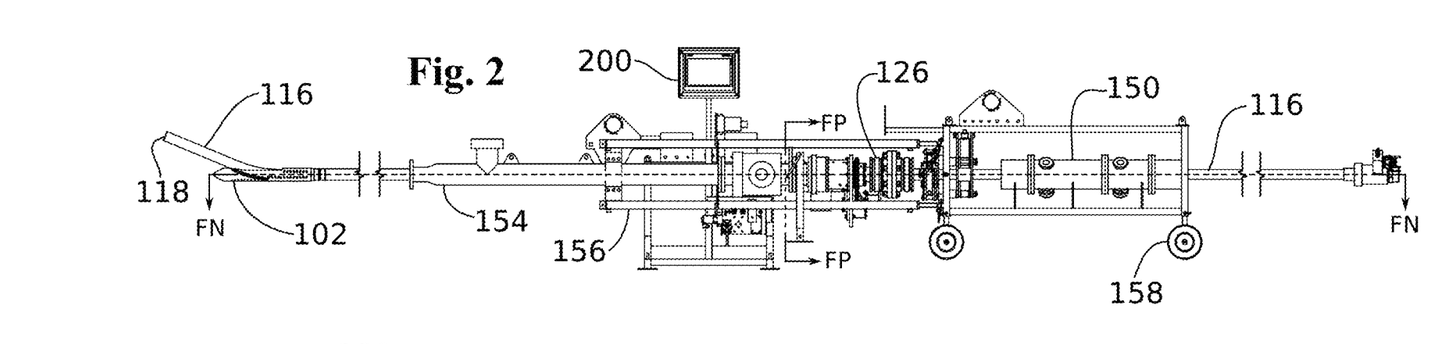
FIG. 2 a side isometric view of the system of FIG. 1.

FIG. 1 shows the tool 100 fully assembled. A BOP 152 is shown inserted on the exterior end of a rigid pipe mandrel 154 and is installed in case of a failure in the flexible tube.

In the embodiment shown in FIGS. 5-10, the displacer 112 is a sloped surface and the head opening 130 is a slot in the rotatable head 102. The sloped surface is cylindrical and forms part of an outer cylindrical shape 128 of the rotatable head and the slot is a cutaway on the cylinder opposite from the sloped surface. The displacer 112 may be any structure or mechanism that can direct the flexible tube to exit the rotatable head in a direction that is offset from the central axis of the rotatable head. The head opening 130 may have any shape or configuration so long as it allows the flexible tube 116 to extend from the head opening 130 into the interior of the tank. In the embodiment in FIGS. 5-10, the displacer 112 acts to change the position of the flexible tube before it exits the rotatable head through the head opening. In other embodiments, the displacer may be on the outside of the rotatable head and the flexible tube may exit the head opening prior to being acted on by the displacer A high-pressure line may also be used to modify the position of the insertable end of the flexible tube. A nozzle on the high-pressure line may itself operate as the displacer.

Figure 33:
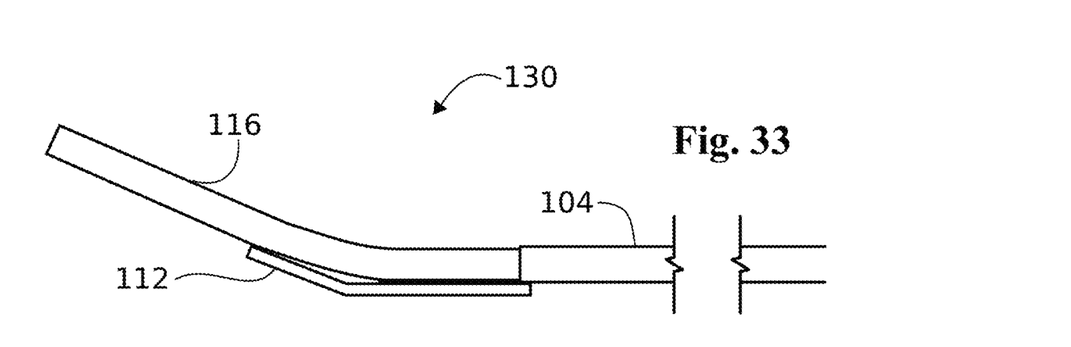
FIG. 33 is a side schematic view of an embodiment of a rotatable head.

FIG. 33 shows an embodiment of the rotatable head 102 in the form of a deflector plate. The displacer 112 is a sloped surface made from a rigid material, where the sloped surface is offset from the axis of the rigid tube. The sloped surface deflects the flexible tube 116 from the axis as it advances further into the tank. The displacer 112 is rigidly connected to the rigid tube 104 and can be directed by rotation of the rigid tube. The head opening 130 in this embodiment is the entire space beyond the end of the rigid tube 104 other than the deflector plate 102. Various different forms of rotatable heads may be used so long as the flexible tube may be deflected to a prescribed angle. In other embodiments, the displacer may be incorporated into the inner diameter and outer diameter of the rigid tube.

As shown in FIGS. 5-10, the sloped surface 112 includes a plurality of rollers 122. The rotatable head 102 also includes a plurality of deep groove ball bearings 124. The ball bearings may be stainless steel. The ball bearings 124 and rollers 122 cooperate to assist the flexible tube to slide through the opening 114 in the rotatable head 102 during directional insertion of the flexible tube 116.

As shown in FIG. 1, a drive 126 is mounted outside of the tank and connected to operatively rotate the rigid tube 104 to change the orientation of the rotatable head 102. The rigid tube may be formed from a plurality of different sections so long as rotation of the drive 126 can cause rotation of the rotatable head. The different sections may have any operational shape or configuration so long as there is a rotationally rigid connection between the drive mechanism and the rotatable head. Other rotation mechanisms may be used to rotate the rotatable head in other embodiments. The drive may be, for example, a mechanical drive, such as an electric mechanical drive as may be used on a drilling rig. The drive and rigid tube must be able to cooperate to rotate the rotatable head. Preferably, the drive mechanisms associated with the operation of the system should be located outside of the tank to minimize dangers associated with operating in potentially explosive, high-pressure areas. A drive shell 162 of the drive 126 is shown in FIGS. 11-13.

The system 100 may be used for various purposes, including sensing, sampling, sludge removal or any combination of those. The system 100 may be used as a comprehensive service for tank owners and operators by providing significant details about the status of the contents of the tank. This can allow for accurate determinations of whether further cleaning is required for the tank and provide accurate assessments of the cleanout costs. When the system 100 is used for sampling, the external end 120 of the flexible tube 116 is operatively connected to a vacuum source 132 (FIG. 20) outside of the tank. The vacuum source may be any of a variety of vacuum sources, including a vacuum truck, vacuum box, vacuum skid or vacuum pump. Various types of vacuum sources may be used. The obtained samples may be deposited in a sample chamber 198 near the vacuum source. The sample may also be held within the flexible tube and then removed when the flexible tube is extracted. Samples may also be removed from a piping connection manifold 150 during installation and removal of the flexible tubing.

Figure 11:
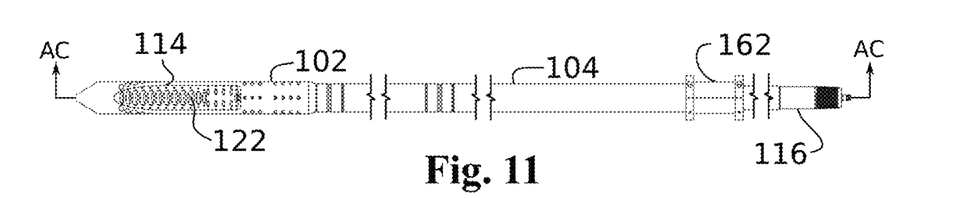
FIG. 11 is top isometric view of a rigid tube.
Figure 12:
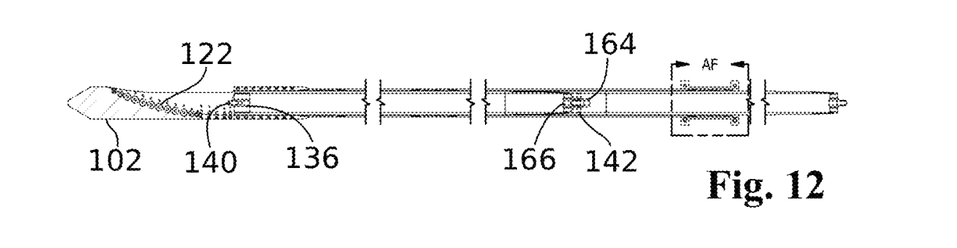
FIG. 12 is a section view of the rigid tube through the section AC-AC of FIG. 11.
Figure 13:
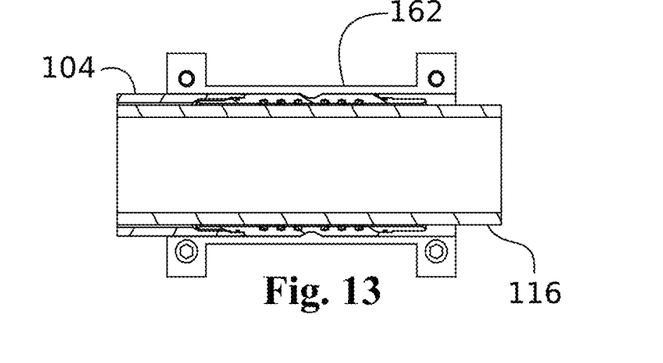
FIG. 13 is a detail view of a drive shell half through the detail AF in FIG. 12.
Figure 14:
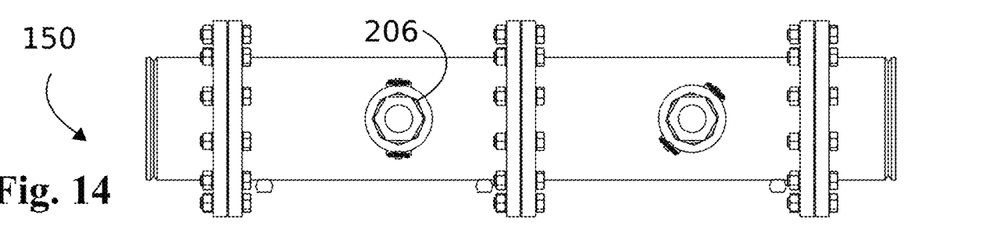
FIG. 14 is a top isometric view of a piping connection manifold.
Figure 15:
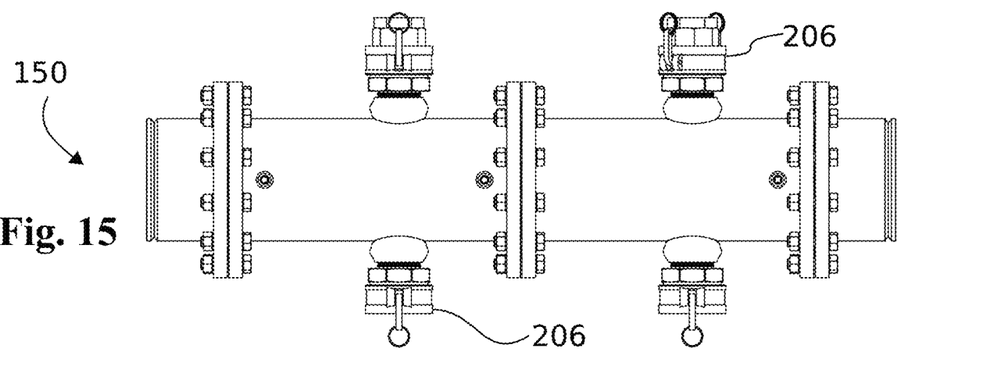
FIG. 15 is a side isometric view of the connection manifold of FIG. 14.
Figure 16:
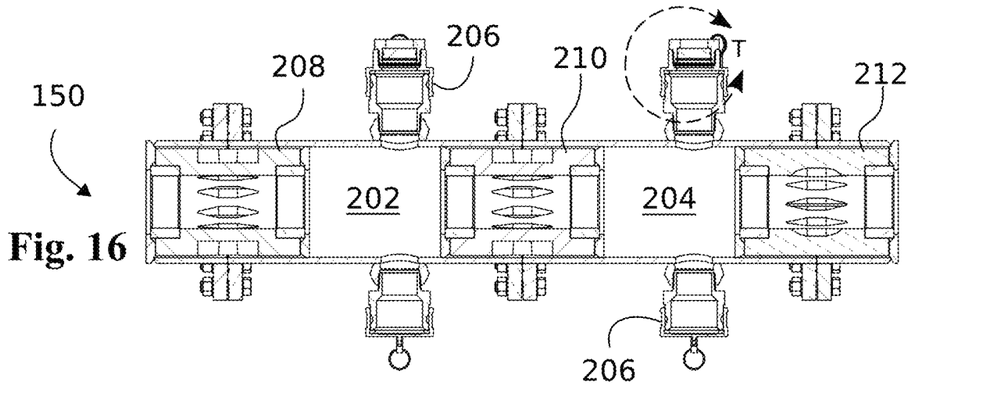
FIG. 16 is a section view through the section A-A of FIG. 14.
Figure 17:
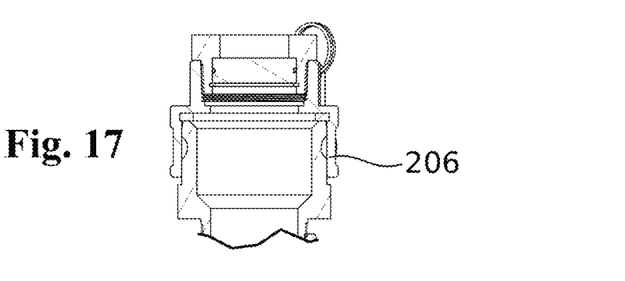
FIG. 17 is a detail view of the detail T in FIG. 17.

FIGS. 11-13 show an embodiment with the flexible tube 116 within the rigid tube 104. A high-pressure line 136 is placed within the flexible tube. As shown in FIG. 12, the high-pressure line 136 is run inside of the flexible tube 116. The high-pressure line 136 is connected to a high-pressure source outside of the tank through the high-pressure head 180. The high-pressure source may be any type of source of high-pressure fluids. The high-pressure fluids may be a combination of bitumen, water and grit. The high-pressure fluids may be chosen based on variables such as the properties of the tank and the properties of the sludge within the tank. The high-pressure line 136 includes a spray nozzle 140 at the insertable end of the flexible tube when the high-pressure line 136 is installed within the flexible tube 116. There are a plurality of spacers or spiders 142 fixing an axial position of the high-pressure line 136 within the flexible tube. As shown in FIGS. 21-24, the spiders 142 may hold the high-pressure line centrally within the flexible tubing. The high-pressure line 136 further comprises a plurality of sections of tubing joined together using female couplings 164 and male couplings 166.

As shown in FIGS. 14-17, the piping connection manifold 150 is used to add and remove lengths of high-pressure tubing 136 and flexible tubing 116 as required. The flexible tubing 116 is formed from multiple threaded sections such as, for example, sections 134 and 144 in FIG. 1. The piping connection manifold 150 has hydraulic bladders 208, 210, 212 that allow for sealing and clamping of the piping joints while being connected and disconnected. The manifolds are the spot where the piping joints are made and allows for controlled drainage of excess liquids in chambers 202, 204 and visual monitoring of the connections. The connection chambers 202, 204 may be isolated during installation and removal to allow for isolation and evacuation of the chambers 202, 204 to maintain tank pressure. Chambers 202, 204 can be drained through ports and hose connections 206. The ports include slight glasses. Additional lengths of coil tubing that make up the flexible tube 116 can be added to the initial length by using a rotating mechanism (not shown) such as a wrench to join threaded lengths of the tube-in-a-tube together. The high-pressure connections are conjoined during the tube threading process by special quick-connect fittings. The high-pressure connections may be designed so that the quick-connection fittings automatically join when the sections of flexible tubing are threaded. Thus, the tool is not limited to the reach of a contiguous piece of pipe. The reach of the tool is limited only by the number of tubing sections inserted through the loading mechanism. The rotating mechanism also controls the angle of injection of the off-set, high-pressure nozzle, which in turn dictates the direction of travel of the sample suction point through the tank.

The flexible tubing 116 is moved in and out of the tank using a hydraulic clamp system within the piping connection manifold 150 which grabs the tubing and inserts it, for example, in 6.5 ft hydraulic ram strokes. Pistons 156 and wheels 158 allow for movement of the piping connection manifold 150 relative to the tank. The flexible tubing is added to the suction line, for example, in 20 ft. lengths and conjoined by a tapered threading system which guides the high-pressure line to the line in front of it, making a secure connection. The tubing is pieced together using a horizontal turning mechanism to ensure the tube lengths are torqued at the correct uniform tightness. The tightening and torqueing mechanism also keep the high-pressure head in the correct alignment. The dimensions provided herein are exemplary.

Figure 18:
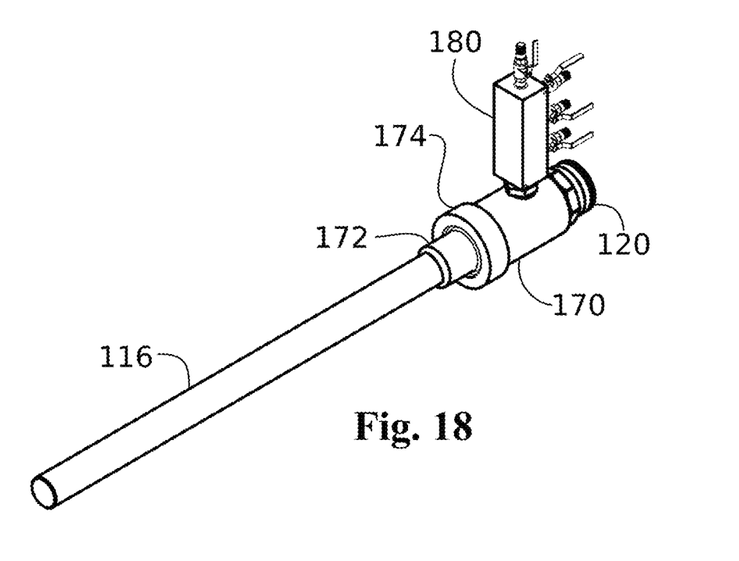
FIG. 18 is an isometric view of an external end of a flexible tube.
Figure 19:
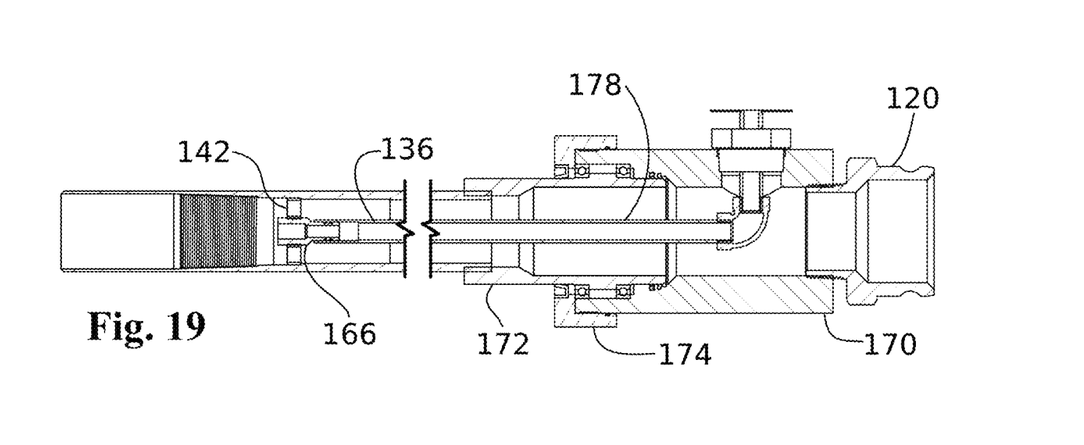
FIG. 19 is section view of the external end of the flexible of FIG. 18.

FIGS. 18 and 19 show the suction end of the flexible tubing with high pressure injection points on a high-pressure head 180. An end swivel shaft 172 sits within a swivel body 174 and a cap 176. The high-pressure head 180 includes multiple high-pressure valve connections for introduction of high-pressure fluids. Within the swivel body is a pipe 178 which is a continuation of the high-pressure line 136 (FIG. 12). Suction is provided through the external end 120 of the flexible tube. The swivel head, including shaft 172, body 174 and cap 176 form part of the external end 120 of the flexible tube. It will be understood that so long as the insertable end of the flexible tube is flexible, the external end of the flexible tube may include various other components, including rigid tubing components so long as a fluid pathway is provided that allows for the extraction of samples. The precise location of the external end 120 is not important as long as a fluid connection is provided between the vacuum source and the insertable end of the flexible tube. The high-pressure injection and suction points on the back end of the tool also allow for the injection of steam to assist with mitigating any blockages in the tool and to allow for the injection of inert gases such as nitrogen into a buoyancy apparatus to be attached to the tool in case vertical suspension is required over longer distances.

Figure 20:
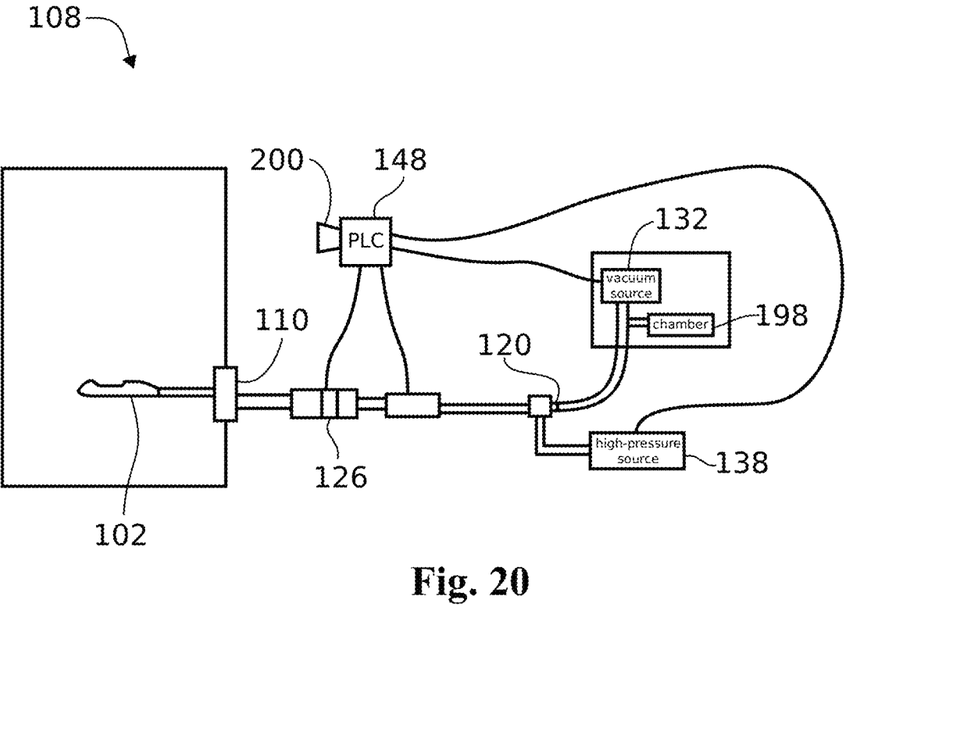
FIG. 20 is a schematic view of a control system for operating components of the system.
Figure 21:
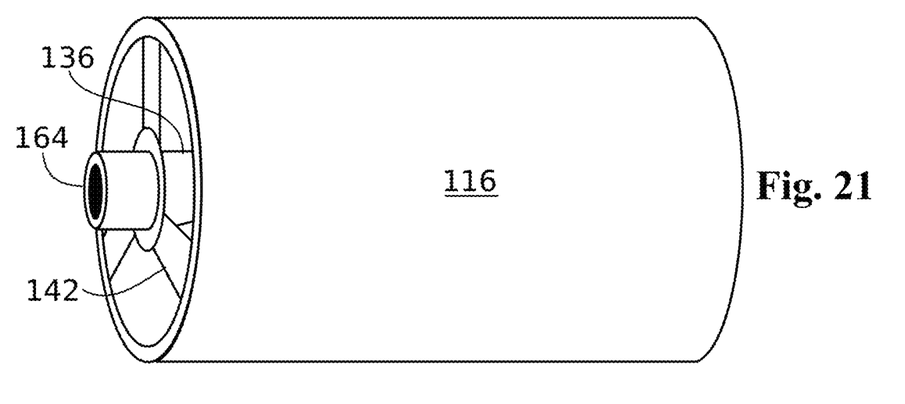
FIG. 21 is a simplified side isometric view of a flexible tube with a high-pressure tube showing a female coupling.
Figure 22:
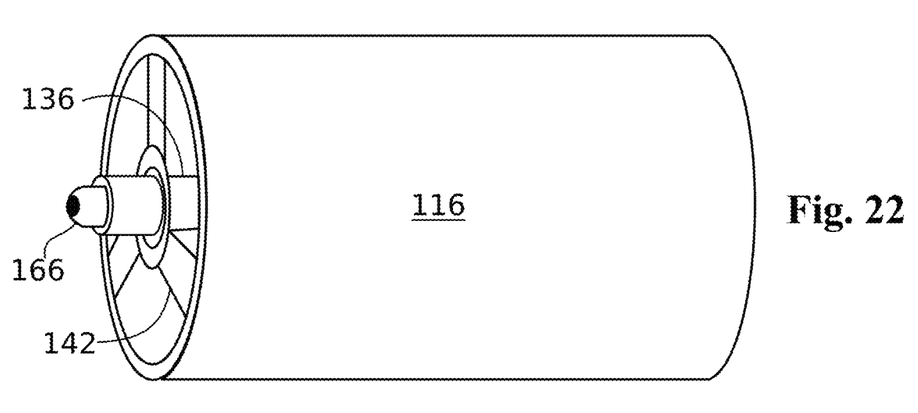
FIG. 22 is a simplified side isometric view of the flexible tube of FIG. 21 with the high-pressure tubing showing a male coupling.
Figure 23:
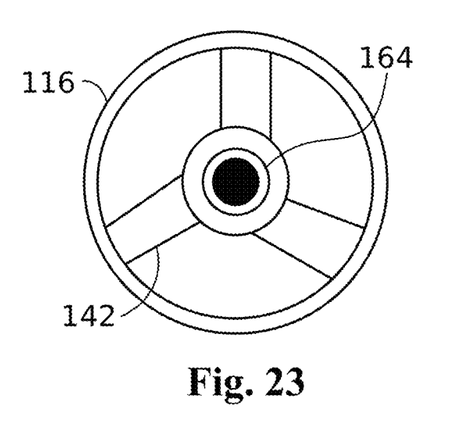
FIG. 23 is a simplified front view of the flexible tube of FIG. 21.
Figure 24:
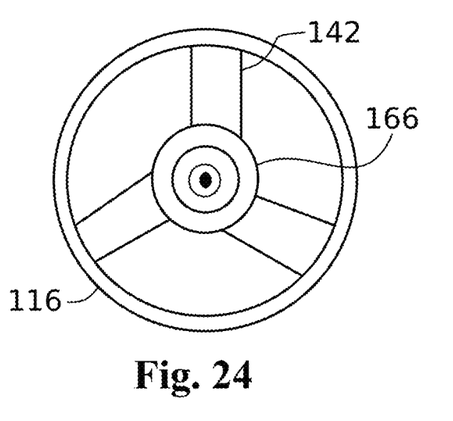
FIG. 24 is a simplified back view of the flexible tube of FIG. 21.
Figure 25:
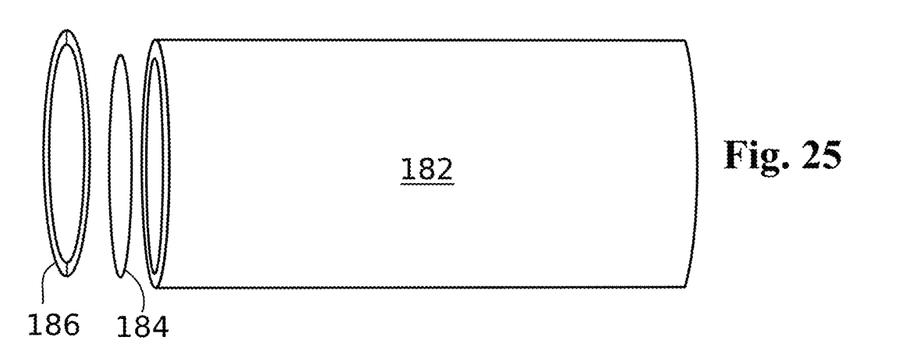
FIG. 25 is an exploded side isometric view of a sensor housing and seals.
Figure 26:
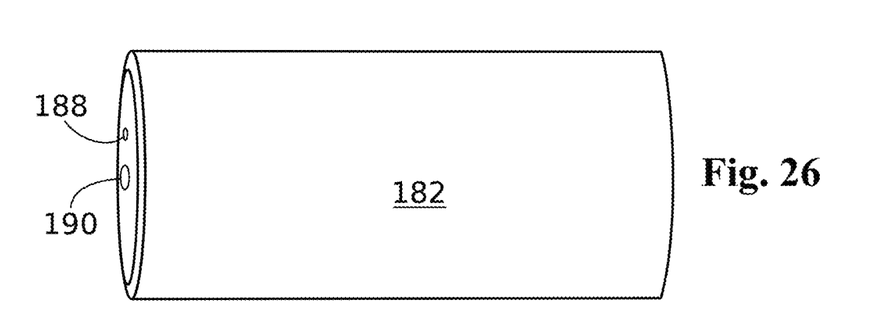
FIG. 26 is a side isometric view of the sensor housing of FIG. 25.
Figure 27:
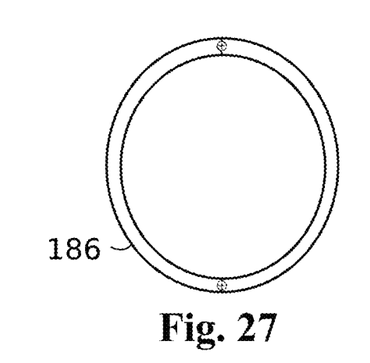
FIG. 27 is a front view of the sensor housing of FIG. 25.
Figure 28:
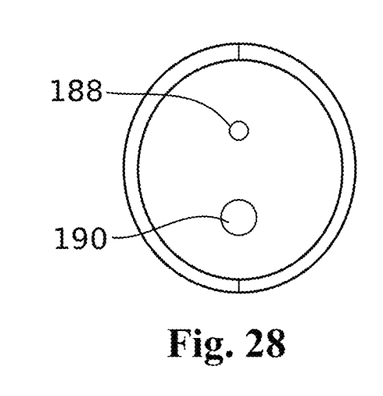
FIG. 28 is a rear view of the sensor housing of FIG. 25.

FIG. 20 shows a schematic of the system 100 (FIG. 1) in operation in a tank 108. The rigid tube 104 and rotatable head 102 are inserted through a tank opening 110. A control system 148 is operatively connected to control the rotation of the rigid tube through the drive 126 and the sliding movement of the flexible tube within the rigid tube through the connection manifold 150. The control system 148 is operatively connected to control the drive 126, to rotate the rotatable head 102 into position. Then, the control system 148 controls the length the flexible tube 116 is inserted into the tank. The control system 148 is also operatively connected to the vacuum source 132 and the high-pressure source 138. The high-pressure source may include multiple sources of fluids. The control system 148 may also control the amount of pressure provided by the high-pressure line which can be used to move the insertable end of the flexible tube within the tank 108. Although the operative connections in FIG. 20 are shown as wired connections, it will be understood that wireless connections may also be used. Various types of processors may be used as a control system 148. As shown in FIG. 1, the control system 148 may be an HMI stand with a control panel 200.

As shown in the embodiments in FIGS. 21-24, the high-pressure line 136 is installed within the flexible tube 116. During installation, the high-pressure line is joined using quick-connect male connections 166 and female connections 164 and placed within the flexible tube prior to inserting the flexible tube through the rigid tube. The flexible tubing is formed from multiple joints that are threaded together.

As shown in the embodiments in FIGS. 25-32, a sensor 146 is mounted on the flexible tube. The sensor is connected to the insertable end of the flexible tubing. Sensing is conducting in a separate operation than sampling. To switch between sampling to sensing, the flexible tubing may be removed from the tank and the high-pressure line may be removed from within the flexible tubing and then the flexible tubing may be reinserted with the sensor at the insertable end. To switch between sensing to sampling, the changes are reversed. Depending on the requirements for accessing the tank, only one of sensing or sampling may be conducted at a site. In some cases sampling may be conducted prior to sensing, or in other cases, after sensing. Cleanout by vacuuming through the flexible tube or assisted by the high-pressure line may also be provided before, after or instead of sampling or sensing.

Figure 29:
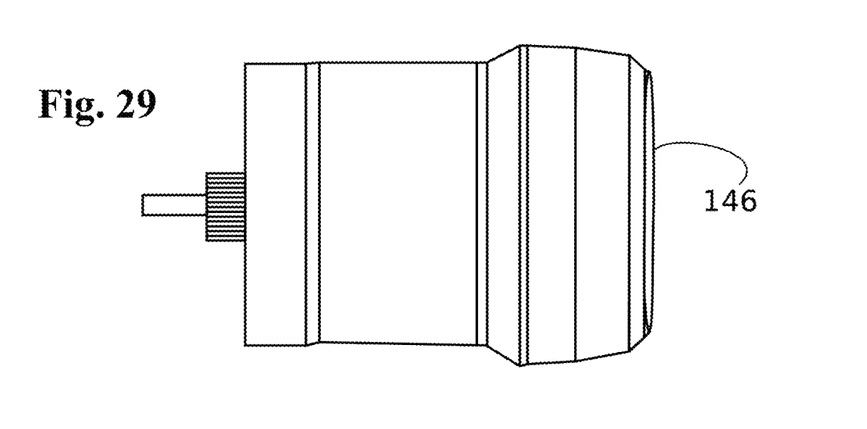
FIG. 29 is a side view of a sonar head.
Figure 30:
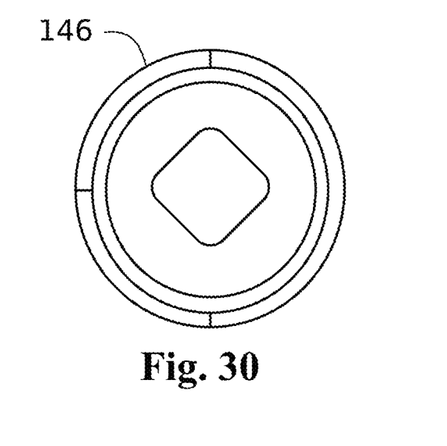
FIG. 30 is a top view of the sonar head of FIG. 29.
Figure 31:
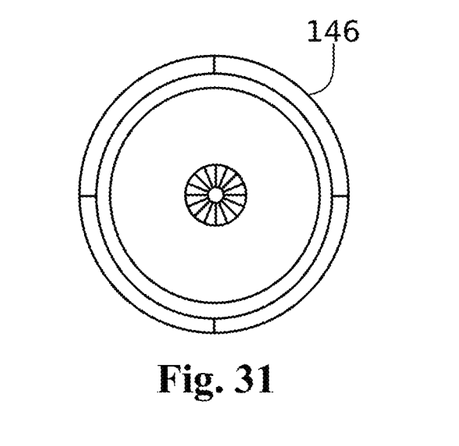
FIG. 31 is a rear view of the sonar head of FIG. 29.
Figure 32:
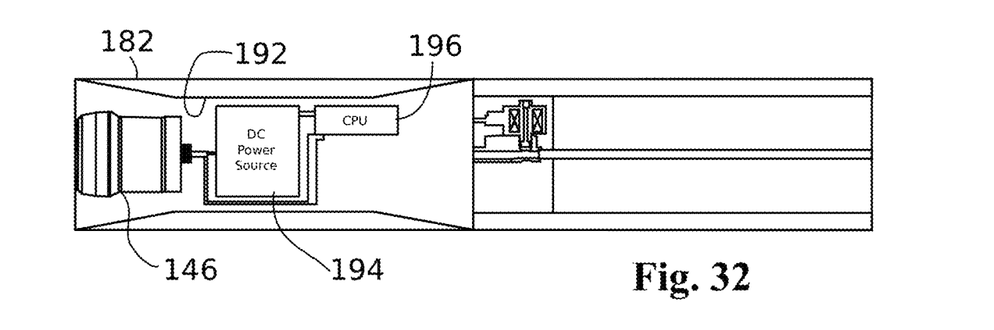
FIG. 32 is a schematic view of a sensor head within a sensor housing.

The sensor 146 sits within a sensor housing 182. As shown in FIG. 29, the sensor 146 is a sonar head. The sensor 146 can obtain information regarding deposits in the interior of the tank. The sensor is connected to a processor 196 and a power source 194. The processor 196 may include a memory or may be connected to an external memory also enclosed within the sensor housing 182. The information obtained by the sensor is stored on the memory. The memory may be a hard drive, or USB thumb drive or other suitable memory. Other types of memories may be used so long as information can be stored and retrieved. Information detected can include the location, nature and consistency of the sludge in the tank. Due to the nature of the high-pressure environment, the sonar head and housing is fully enclosed. The memory can be accessed after the flexible tubing is removed from the tank.

The sensor housing includes at one end an o-ring 184 and front seal 186 and at the other end a cover including an opening for an electrical connection 188 and for a gas connection 190. As shown in the embodiment in FIG. 32, the sensor housing includes buoyancy foam 192 to maintain the sensor head in position within the tank.

The operation of the tool may be managed from a control panel 200 (FIG. 1) connected to the processor 148 that measures the positioning of the suction head/insertable end 118 by calculation of the force on the pressure nozzle and the resistance of the flexible tubing according to the distance it is inserted into the tank. The distance that the flexible tube is inserted from the tank shell is measured by a laser apparatus mounted on the tool on the outside of the tank 108 (FIG. 20). Measurements account for both distance and the angle of the pressure nozzle to determine the suction point's position in the tank. The logic is all pre-programed into the control panel.

In operation, the rotatable head 102 can be rotated by the control system 148 rotating the rigid tube 104. The insertable end 118 of the flexible tube 116 is extended through the head opening. A sample is obtained from inside the tank through the insertable end of the flexible tube through the application of a suction force from a vacuum source at the external end of the flexible tube to obtain the sample. High-pressure fluids may be provided into the interior of the tank through the high-pressure line. Fluid from the high-pressure line can be applied to deposits within the tank prior to obtaining the sample from inside the tank through the insertable end of the flexible tank.

The flexible tube 116 is initially directed by extruding the tubing through the directional roller head 102 once it is inserted into the tank through an available valve on the tank shell. Fluid is injected through the high-pressure internal line 136 in order to move the suction point at the end of the flexible suction tubing. The high-pressure injection fluid may be employed through the nozzle intermittently to move the suction point in an arcing motion across the bottom of a sludge bed. This allows the insertable end of the flexible tubing to sweep across the tank to obtain samples from a variety of locations. Fluid can also be injected at high pressure using various types of tips to degrade more persistent sludge deposits.

During installation, the rotatable head and rigid tube are installed into the tank through the tank opening. The flexible tube is installed through the rigid tube so that the insertable end of the flexible tube is directable by the displacer through the head opening into the interior of the tank at an angle offset from the central axis of the rigid tube.

The system 100 provides a moveable sample point within the internals of above ground storage tanks. The flexible tube 116 is extruded through the larger rigid tubing 104 at specified pre-determined distances from the tank shell and is directed by use of the roller-head apparatus 102 which bends the flexible tube 116 toward the desired angle as it is extruded. The flexible tube 116 is used to extract samples from the tank using the external vacuum source 132. The flexible tube 116 has the smaller contained flexible high-pressure line 136 running through the middle and projecting out at an angle beyond the suction point at the end of the flexible tubing. At the end of the high-pressure line there is high-pressure nozzle 140 off-set at an angle which pushes the suction point in a radial direction across the tank bottom when a pressure stream is applied. The nozzle on the high-pressure tubing is off-set at an angle to allow injected fluid to push or steer the suction point to the desired location inside the tank. The exact location of the suction point in the tank is determined by using a PLC pre-programed to calculate the location of the suction point based on pressure, angle, and flow from the high-pressure nozzle.

Embodiments of the system provide an improved method for retrieving representative samples from sludge deposition in the bottom of above ground storage tanks. The tool 100 allows for the retrieval of samples from virtually any location across the tank floor and allows for retrieval of samples from tanks with internal floating roofs without the requirement for manned entry into the interstice between the external roof and the internal floating roof. The use of the roller head 102 for directional control allows for retrieval of samples on both horizontal and vertical planes. The ability to take samples at various locations and depths provides improvements over most currently available techniques.

The system 100 works from the bottom of the tank and the sampling/suction point is moved throughout the tank to the desired distance from the tank shell (wall) and to desired depths of the material contained inside the tank.

The system 100 can be inserted into the tank at grade level and can move throughout the tank on various horizontal and vertical planes. The tool 100 comprises a flexible high-pressure line contained inside a flexible suction tube and inserted into the tank through a rigid mandrel.

The tool has the ability to draw samples from various points in a tank and can be used as a device to retrieve samples for analysis or as a tool to debulk sludge from tanks prior to landing internal and external floating roofs, prior to isolation of the tank for maintenance, or de-sludging tanks while they remain in service.

Embodiments of the systems and methods allow for adequate and non-intrusive sampling of large above ground storage and allow for the retrieval of representative samples from virtually anywhere within the tank. Samples may be taken from areas of the tank that cannot normally be reached without taking the tank out of service. More representative samples can be retrieved without the hazards associated with opening live tanks to get samples.

By allowing for sampling work to be done from the ground, the risk of working on top of tanks or in the hazardous interstitial space between internal floating roofs and fixed roofs is eliminated. The tool 100 provides a platform for insertion of other scoping and profiling instruments in a non-intrusive manner.

Exemplary specifications of components of the system 100 include the following.

A) Swivel drive:
HNBR (HSN80) Material
Temperature Range: −40° C. to +148° C.
Tensile Strength: 3180 psi
Nitrile Duro 70
Operating Temperature: −48° C. to +107° C.
Polyurethane AU 92A
Operating Temperature: −34° C. to 82° C.
Ultimate Tensile Strength: 2432 psi
PTFE/NBR
Operating Temperature: −54° C. to +121° C.
Ultimate Tensile Strength: 4351 psi
416364 Nitrile Oil Seal
Operating Temperature: −40° C. to +107° C.
Max RPM: 3000
51130 M Ball Thrust Bearing
Operating Temperature: −40° C. to +120° C.
Max RPM: 2400
Dynamic Load Capacity: 24954 lbf
Static Load Capacity: 98916 lbf
61828-2RS1 Deep Groove Ball Bearing
Operating Temperature: −40° C. to +° C.
Max RPM: 2000
Dynamic Load Capacity: 8768 lbf
Static Load Capacity: 10454 lbf
16DFF-1-5-27 Heco Planetary Gearbox
27.04 to 1 ratio
20,000 lbs Maximum Radial Load
45,000 in-lbs Intermittent Torque
60,000 in-lbs Peak Torque
85 rpm Maximum Output Speed
2¼" keyed shaft
SAE B; 2 bolt motor adapter
1" straight keyed motor shaft (2.10" max length)
SAE 85W-140 multi-grade gear oil recommended for extended life
H38D-1024-ABZ-28VV-SC-UL BEI Incremental Optical Encoder
Max RPM: 10,000
Cycles per shaft revolution: 1024
Up to 40 lbs axial and 20 lbs radial shaft loading
⅜" Nominal Shaft Diameter (303 Stainless Steel)
5 to 28 VDC in/out
Dual channel with index
½-14 NPSF side conduit
Class 1 Group D environmental certification B) Connection Manifold
Suggested working pressure: 200 PSI C) End Swivel
Suggested working pressure: 200PSI
61820-2RS1 Deep Groove Ball Bearing
Operating Temperature: −40° C. to 99° C.
Max RPM: 3000
Dynamic Load Capacity: 4002 lbf
Static Load Capacity: 4114 lbf
Hydraulic push/pull set to max 900 lbs per cylinder. Value is a preset that can be adjusted. 286 psi extending and 383 psi retracting.

Preferably, the flexible tube is made from a thermoplastic polymer which provides for flexibility for the flexible tube to move flexibly through the displacer, but still maintains sufficient rigidity to allow the system to predict where the insertable end will be positioned within the tank interior during operation. The flexible tubing may be made from high density polypropylene. Preferably, the flexible tubing is made from an aliphatic polyketone, such as Poketone™ Polymer M730R as is supplied by Hyosung Chemical Corporation.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A system for accessing contents of a tank through a tank opening disposed on the tank, the system comprising:
a rotatable head connected to a rigid tube having a central axis, the rotatable head being adapted to be inserted through the tank opening, the rotatable head comprising a displacer and a head opening; and
a flexible tube having an insertable end and an external end, and the flexible tube slideably movable within the rigid tube and having a range of motion relative to the rigid tube so that the insertable end of the flexible tube can be directed by the displacer through the head opening at an angle offset from the central axis of the rigid tube.

2. The system of claim 1 in which the displacer is a sloped surface.

3. The system of claim 1 further comprising a drive mounted outside of the tank and connected to operatively rotate the rigid tube to change an orientation of the rotatable head.

4. The system of claim 1 in which the system is used for sampling and the external end of the flexible tube is operatively connected to a vacuum source outside of the tank.

5. The system of claim 1 further comprising a high-pressure line within the flexible tube.

6. The system of claim 5 in which the high-pressure line is connected to a high-pressure source outside of the tank.

7. The system of claim 5 in which the high-pressure line further comprises a spray nozzle at the insertable end of the flexible tube.

8. The system of claim 5 further comprising a plurality of spacers fixing an axial position of the high-pressure line within the flexible tube.

9. The system of claim 5 in which the high-pressure line further comprises a plurality of sections of tubing threaded together.

10. The system of claim 1 further comprising a sensor mounted on the insertable end of the flexible tube.

11. The system of claim 10 in which the sensor is a sonar head.

12. The system of claim 1 further comprising a control system operatively connected to control a rotation of the rigid tube and a sliding movement of the flexible tube within the rigid tube.

13. The system of claim 3 further comprising a control system operatively connected to control the drive.

14. The system of claim 1 in which the flexible tube is made from high density polypropylene.

15. A method of operating a system for accessing contents of a tank through an opening, the method comprising:
   operating a rotatable head connected to a rigid tube having a central axis, the rotatable head being inserted through the tank opening, the rotatable head comprising a displacer and a head opening;
   operating a flexible tube having an insertable end and an external end, and the flexible tube slideably movable within the rigid tube and having a range of motion relative to the rigid tube so that the insertable end of the flexible tube can be directed by the displacer through the head opening at an angle offset from the central axis of the rigid tube;
   rotating the rotatable head; and
   extending the insertable end of the flexible tube through the head opening.

16. The method of claim 15 further comprising obtaining a sample from inside the tank through the insertable end of the flexible tube.

17. The method of claim 16 in which obtaining a sample from inside the tank through the insertable end of the flexible tube further comprises applying a suction force from a vacuum source at the external end of the flexible tube to obtain the sample.

18. The method of claim 16 in which a high-pressure line is provided within the flexible tube and in which the method further comprises applying high-pressure fluids into an interior of the tank through the high-pressure line.

19. The method of claim 18 in which the high-pressure line further comprises a spray nozzle at the insertable end of the flexible tube.

20. The method of claim 19 in which fluid from the high-pressure line is applied to deposits within the tank prior to obtaining the sample from inside the tank through the insertable end of the flexible tube.

\* \* \* \* \*